US 10,969,106 B2

(12) United States Patent
Hanson et al.

(10) Patent No.: US 10,969,106 B2
(45) Date of Patent: Apr. 6, 2021

(54) AXIAL RETENTION ASSEMBLY FOR COMBUSTOR COMPONENTS OF A GAS TURBINE ENGINE

(71) Applicant: General Electric Company, Schenectady, NY (US)

(72) Inventors: Stuart Craig Hanson, Anderson, SC (US); Thomas Alan Mogle, II, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 16/539,164

(22) Filed: Aug. 13, 2019

(65) Prior Publication Data

US 2021/0047967 A1    Feb. 18, 2021

(51) Int. Cl.
  *F23R 3/60*    (2006.01)
  *F02C 7/20*    (2006.01)
  (Continued)

(52) U.S. Cl.
  CPC .............. *F23R 3/60* (2013.01); *F01D 25/28* (2013.01); *F01D 25/285* (2013.01); *F02C 7/20* (2013.01);
  (Continued)

(58) Field of Classification Search
  CPC .. F23R 3/60; F23R 3/002; F01D 25/28; F01D 25/285; F02C 7/20; F05D 2260/36
  See application file for complete search history.

(56) References Cited

U.S. PATENT DOCUMENTS 2,706,495 A    4/1955 Risley
4,039,115 A    8/1977 Randolph et al.
(Continued)

FOREIGN PATENT DOCUMENTS

DE    4340530 A1    6/1995
EP    2489938 A2    8/2012
(Continued)

OTHER PUBLICATIONS

International Patent Application No. PCT/US2020/043176; International Search Report; dated Oct. 12, 2020; (3 pages).
(Continued)

*Primary Examiner* — Steven M Sutherland
(74) *Attorney, Agent, or Firm* — Dority & Manning, P.A.

(57) ABSTRACT

The present subject matter is directed to an axial retention assembly for combustor components of a gas turbine engine. The axial retention assembly may include a combustor having include a liner defining a liner aperture extending therethrough. Additionally, the combustor may further include a sleeve defining a sleeve aperture extending therethrough, with the sleeve positioned radially outward from and at least partially circumferentially positioned around the liner. Furthermore, the axial retention assembly may include a frame having a mounting projection positioned within the sleeve aperture. Moreover, the axial retention assembly may include a clamp plate adjustably coupled to the frame. In addition, the axial retention assembly may include a clamp plate adjustment rod extending through the liner aperture and threadingly engaging the clamp plate such that relative movement between the liner and the sleeve along the axial centerline is reduced.

20 Claims, 4 Drawing Sheets

(51) Int. Cl.
  *F01D 25/28* (2006.01)
  *F23R 3/00* (2006.01)
(52) U.S. Cl.
  CPC .......... *F23R 3/002* (2013.01); *F05D 2260/36* (2013.01); *F23R 2900/00017* (2013.01)

(56) References Cited

U.S. PATENT DOCUMENTS

| | | | |
|---|---|---|---|
| 4,202,539 A | | 5/1980 | Polastri et al. |
| 4,337,932 A | | 7/1982 | Dennis et al. |
| 4,358,143 A | | 11/1982 | Cullen |
| 4,491,307 A | | 1/1985 | Ellefson |
| 4,687,244 A | | 8/1987 | Cullen et al. |
| 4,749,029 A | * | 6/1988 | Becker .................... F23R 3/002 165/169 |
| 5,392,322 A | | 2/1995 | Whitling et al. |
| 5,513,838 A | | 5/1996 | Van Rossum |
| 5,600,690 A | | 2/1997 | Weems et al. |
| 5,624,256 A | * | 4/1997 | Pfeiffer .................... F23M 5/04 110/336 |
| 5,642,979 A | | 7/1997 | Cullen et al. |
| 6,158,475 A | | 12/2000 | Clemmer |
| 6,354,644 B1 | | 3/2002 | Zaguroli, Jr. et al. |
| 6,371,468 B1 | | 4/2002 | Lessard et al. |
| 6,371,685 B1 | | 4/2002 | Weems et al. |
| 6,397,765 B1 | * | 6/2002 | Becker .................... F23M 5/04 110/336 |
| 6,708,966 B1 | | 3/2004 | Troudt |
| 6,716,018 B2 | | 4/2004 | Abrego et al. |
| 6,733,058 B1 | | 5/2004 | Nakajima |
| 7,225,837 B1 | | 6/2007 | Kane |
| 8,104,290 B2 | | 1/2012 | Ellis et al. |
| 8,448,444 B2 | | 5/2013 | Cihlar et al. |
| 10,294,082 B2 | | 5/2019 | Merlau et al. |
| 2001/0045695 A1 | | 11/2001 | Andronica |
| 2011/0247193 A1 | | 10/2011 | Herbold |
| 2011/0314829 A1 | | 12/2011 | Kuppusamy |
| 2012/0036857 A1 | | 2/2012 | Bassani |
| 2012/0096700 A1 | | 4/2012 | Patterson et al. |
| 2012/0186269 A1 | | 7/2012 | Cihlar et al. |
| 2014/0230246 A1 | | 8/2014 | McMahon et al. |
| 2015/0071704 A1 | | 3/2015 | Senofonte et al. |
| 2016/0363323 A1 | | 12/2016 | Mogle et al. |
| 2016/0376926 A1 | | 12/2016 | Hanson et al. |
| 2018/0038520 A1 | | 2/2018 | Pionetti |
| 2018/0306446 A1 | * | 10/2018 | Merlau .................... B25B 5/147 |
| 2019/0010026 A1 | | 1/2019 | Merlau et al. |

FOREIGN PATENT DOCUMENTS

| | | |
|---|---|---|
| EP | 3106756 A1 | 12/2016 |
| EP | 3293370 A1 | 3/2018 |
| EP | 3391998 A1 | 10/2018 |
| FR | 3032511 A1 | 8/2016 |
| WO | WO2014/126641 | 8/2014 |

OTHER PUBLICATIONS

European Search Report Corresponding to EP Application No. 181676875 dated Aug. 31, 2018.
European Search Report Corresponding to EP Application No. 181781550 dated Dec. 11, 2018.
U.S. Appl. No. 16/514,296, filed Jul. 17, 2019.

* cited by examiner

AXIAL RETENTION ASSEMBLY FOR COMBUSTOR COMPONENTS OF A GAS TURBINE ENGINE

FIELD

The present disclosure generally relates to gas turbine engines. More particularly, the present disclosure relates to axial retention assemblies for reducing or preventing the axial movement of combustor components of a gas turbine engine.

BACKGROUND

A gas turbine engine generally includes a compressor, one or more combustors, a turbine, and an exhaust section. The compressor progressively increases the pressure of a working fluid (e.g., air) entering the gas turbine engine and supplies this compressed working fluid to the combustor(s). The compressed working fluid and a fuel (e.g., natural gas) mix and burn within the combustor(s) to generate combustion gases. The combustion gases, in turn, flow from each combustor into the turbine where they expand to produce work. For example, expansion of the combustion gases in the turbine section may rotate a rotor shaft connected to a generator to produce electricity. The combustion gases then exit the gas turbine via the exhaust section.

Each combustor typically includes a liner, a sleeve, and a combustor casing. More specifically, the liner defines a combustion chamber in which the mixture of compressed working fluid and fuel burns. The sleeve at least partially circumferentially surrounds the liner. In this respect, the sleeve and the liner define a flow passage through which the compressed air may flow before entering the combustion chamber. Furthermore, the combustor casing is coupled to the sleeve and defines a chamber positioned upstream of the combustion chamber. One or more fuel nozzles are positioned in the chamber defined by the combustor casing, with each fuel nozzle supplying the fuel to the combustion chamber.

When manufacturing a gas turbine engine, the various components of the combustor are generally pre-assembled or otherwise loosely coupled together before the combustor is installed into the engine. As such, the pre-assembled combustor must generally be transported within the factory to the final assembly location of the gas turbine engine. However, the liner and the casing of the pre-assembled combustor are typically not coupled together in a manner that prevents or minimizes the movement of such components along the axial centerline of the combustor. As such, the fuel lines of the combustor may be damaged during transportation, thereby necessitating expensive and time-consuming repairs.

BRIEF DESCRIPTION

Aspects and advantages of the technology will be set forth in part in the following description, or may be obvious from the description, or may be learned through practice of the technology.

In one aspect, the present subject matter is directed to an axial retention assembly for combustor components of a gas turbine engine. The axial retention assembly may include a combustor defining an axial centerline extending between a forward end of the combustor and an aft end of the combustor. The combustor may further define a radial direction extending orthogonally outward from the axial centerline. The combustor may include a liner defining an aperture extending therethrough. Additionally, the combustor may further include a sleeve defining a sleeve aperture extending therethrough, with the sleeve positioned radially outward from and at least partially circumferentially positioned around the liner. Furthermore, the axial retention assembly may include a frame having a mounting projection positioned within the sleeve aperture. Moreover, the axial retention assembly may include a clamp plate adjustably coupled to the frame. In addition, the axial retention assembly may include a clamp plate adjustment rod extending through the liner aperture and threadingly engaging the clamp plate such that relative movement between the liner and the sleeve along the axial centerline is reduced.

In another aspect, the present subject matter is directed to a gas turbine engine. The gas turbine may include a combustor defining an axial centerline extending between a forward end of the combustor and an aft end of the combustor. The combustor may further define a radial direction extending orthogonally outward from the axial centerline. Additionally, the combustor may include a liner defining an aperture extending therethrough and a combustion chamber therein. Moreover, the combustor may include a sleeve defining a sleeve aperture extending therethrough, with the sleeve positioned radially outward from and at least partially circumferentially positioned around the liner. Furthermore, the sleeve and the liner defining a flow passage therebetween. In addition, the gas turbine may include a plurality of axial retention tools. Each axial retention tool may include a frame having a mounting projection positioned within the sleeve aperture. Each axial retention tool may also include a clamp plate adjustably coupled to the frame. Additionally, each axial retention tool may include a clamp plate adjustment rod extending through the liner aperture and threadingly engaging the clamp plate such that relative movement between the liner and the sleeve along the axial centerline is reduced.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode of practicing the various embodiments, is set forth in the specification, which makes reference to the appended figures, in which.

Figure 1:
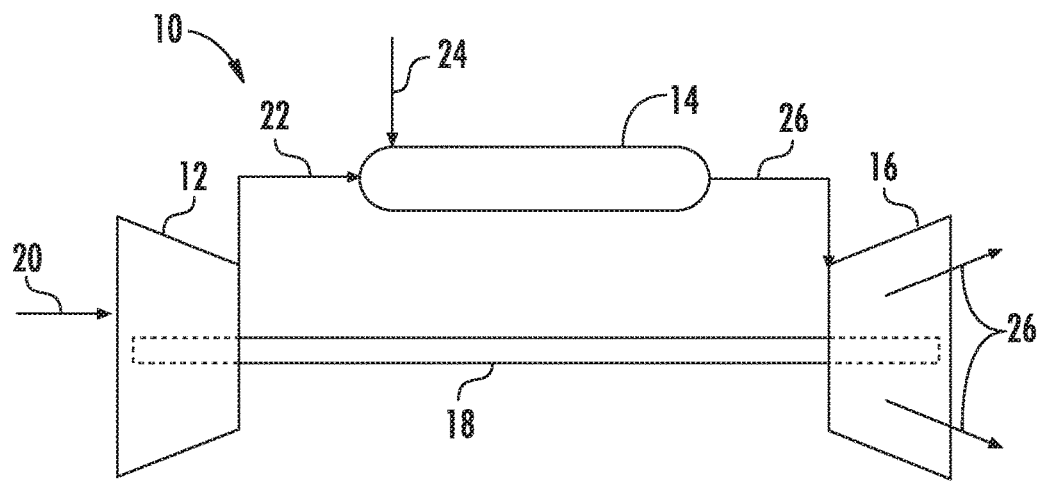
FIG. 1 is a schematic view of one embodiment of a gas turbine engine in accordance with aspects of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

In general, the present disclosure is directed to axial retention assemblies for combustor components of a gas turbine engine. Specifically, in several embodiments, the axial retention assembly may include one or more axial retention tools for reducing or preventing axial movement between a liner of a combustor and a sleeve of the combustor of during transportation and handling of the combustor (e.g., when installing the combustor in the gas turbine engine). In this respect, each axial retention tool may include a frame and a clamp plate adjustably coupled to the frame. Additionally, each axial retention tool may include a clamp plate adjustment rod that threadingly engages the clamp plate. As such, rotation of the clamp plate adjustment rod relative to the clamp plate may move the clamp plate into contact with the liner and the frame in to contact with the sleeve, thereby reducing or preventing relative movement between the liner and the sleeve in a radial direction of the combustor. Moreover, each clamp plate adjustment rod may extend through a corresponding aperture defined by the liner. Furthermore, each frame may include a mounting projection extending outward in the radial direction. Each mounting projection may, in turn, be positioned or otherwise received within a corresponding aperture defined by the sleeve. In this regard, the positioning of the mounting projection(s) within the sleeve aperture(s) and the clamp plate adjustment rod(s) within the liner aperture(s) may reduce or prevent relative movement between the liner and the sleeve along the axial centerline of the combustor. Thus, the axial retention assembly permits transportation and handling of the combustor without resulting in damage to the fuel lines and/or other components of the combustor.

Although an industrial or land-based gas turbine is shown and described herein, the present technology as shown and described herein is not limited to a land-based and/or industrial gas turbine unless otherwise specified in the claims. For example, the technology as described herein may be used in any type of turbomachine including, but not limited to, aviation gas turbines (e.g., turbofans, etc.), steam turbines, and marine gas turbines.

Referring now to the drawings, FIG. 1 illustrates a schematic diagram of one embodiment of a gas turbine engine 10 in accordance with aspects of the present disclosure. As shown, the gas turbine engine 10 may generally include a compressor 12, one or more combustors 14 positioned downstream of the compressor 12, and a turbine 16 positioned downstream of the combustor(s) 14. Furthermore, the gas turbine engine 10 may include one or more shafts 18 coupling the compressor 12 and the turbine 16.

During operation of the gas turbine engine 10, a working fluid (e.g., as indicated by arrow 20), such as air, may flow into the compressor 12. The compressor 12 may, in turn, progressively compress the working fluid 20 to provide a pressurized working fluid (e.g., as indicated by arrow 22) to the combustor(s) 14. The pressurized working fluid 22 may mix with a fuel (e.g., as indicated by arrow 24) and burn within the combustor(s) 14 to produce combustion gases (e.g., as indicated by arrow 26). The combustion gases 26 may then flow from the combustor(s) 14 into the turbine 16, where rotor blades (not shown) extract kinetic and/or thermal energy from the combustion gases 26. This energy extraction may cause the shaft(s) 18 to rotate. The mechanical rotational energy of the shaft 18 may then be used to power the compressor 12 and/or generate electricity. Thereafter, the combustion gases 26 may be exhausted from the gas turbine engine 10.

Figure 2:
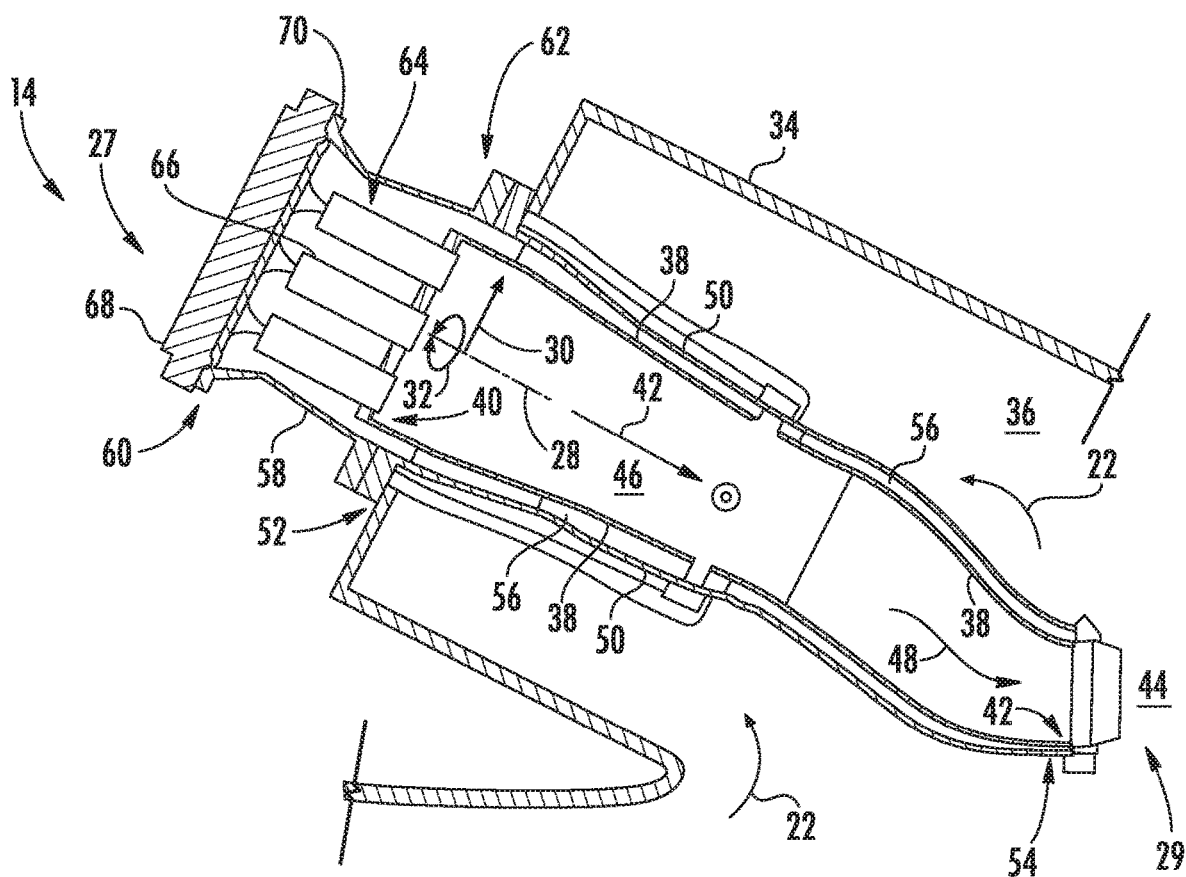
FIG. 2 is a cross-sectional side view of a combustor of a gas turbine engine in accordance with aspects of the present disclosure.

FIG. 2 illustrates one embodiment of a combustor 14 of a gas turbine engine in accordance with aspects of the present disclosure. As shown, the combustor 14 may define an axial centerline 28 extending from a forward end 27 of the combustor 14 and an aft end 29 of the combustor 14. Furthermore, the combustor 14 may define a radial direction 30 extending orthogonally outward from the axial centerline 28. Moreover, the combustor 14 may define circumferential direction 32 extending circumferentially around the axial centerline 28.

As shown, the combustor 14 may be installed in or otherwise at least partially received by a compressor discharge casing 34 of the gas turbine engine 10. The compressor discharge casing 34 may at least partially define a pressure plenum 36 at least partially surrounding various components of the combustor 14. Moreover, the pressure plenum 36 may be fluidly coupled to the compressor 12 (FIG. 1). As such, the pressure plenum 36 may receive the compressed working fluid 22 therefrom and provide the received compressed work fluid 22 to the combustor 14.

In several embodiments, the combustor 14 may include a combustion liner or duct 38. More specifically, the liner 38 may extend along the axial centerline 28 of the combustor 14 from a forward end 40 of the liner 38 to an aft end 42 of the liner 38. The aft end 42 may, in turn, be positioned adjacent to an inlet 44 of the turbine 16. In one embodiment, the forward end 40 may have a generally cylindrical cross-section, while the aft end 42 may have a generally rectangular cross-section. Furthermore, as shown, the liner 38 may at least partially define a combustion chamber or zone 46 in which a mixture of the pressurized work fluid 22 and the fuel 24 (FIG. 1) burns to form the combustion gases 26 (FIG. 1). Moreover, the liner 38 may also at least partially define a hot gas path 48 through the combustor 14 for directing the combustion gases 26 towards the turbine inlet 44. In some embodiments, the liner 38 may be formed as a single component (known as a unibody). However, in alternative embodiments, the liner 38 may have any other suitable configuration.

Moreover, the combustor 14 may include an outer sleeve 50 extending along the axial centerline 28 of the combustor 14 from a forward end 52 of the sleeve 50 to an aft end 54 of the sleeve 50. As shown, in several embodiments, the sleeve 50 may be positioned partially circumferentially around the liner 38 such that the sleeve 50 surrounds or encloses the liner 38. Furthermore, the sleeve 50 may be spaced apart from the liner 38 in the radial direction 30 to define a flow passage 56 therebetween. In this respect, the sleeve 50 may define a plurality of apertures (not shown) that fluidly couple the pressure plenum 36 and the flow passage 56. As such, the compressed working fluid 22 may flow from the pressure plenum 36 through the flow passage 56 for eventual delivery to the combustion chamber 46. In general, the sleeve 50 may be unrestrained relative to or decoupled from the liner 38 to permit relative movement therebetween along the axial centerline 28 (e.g., due to thermal gradients between the liner 38 and the sleeve 50). In some embodiments, the sleeve 50 may be formed as a single component (known as a unibody). However, in alternative embodiments, the sleeve 50 may have any other suitable configuration.

Additionally, the combustor 14 may include a combustor casing 58 coupled to the forward end 52 of the sleeve 50. Specifically, in several embodiments, the combustor casing 58 may extend along the axial centerline 28 of the combustor 14 from a forward end 60 of the combustor casing 58 to an aft end 62 of the combustor casing 58. Furthermore, as shown, the combustor casing 58 may define a head end volume 64 of the combustor 14 therein. The head end volume 64 may, in turn, be positioned upstream of the combustion chamber 46 along the axial centerline 28. In this respect, one or more fuel nozzles 66 may be positioned within the head end volume 64 to supply the fuel 24 to the combustion chamber 46. Furthermore, an end cover 68 may be coupled to the forward end 60 of the combustor casing 58. For example, in one embodiment, the end cover 68 may be coupled to a mounting flange 70 of the combustor casing 58 (e.g., via bolts or other suitable fasteners). However, in alternative embodiments, the combustor casing 58 may have any other suitable configuration.

The configuration of the gas turbine engine 10 described above and shown in FIGS. 1 and 2 is provided only to place the present subject matter in an exemplary field of use. Thus, it should be appreciated that the present subject matter may be readily adaptable to any manner of gas turbine engine configuration.

Figure 3:
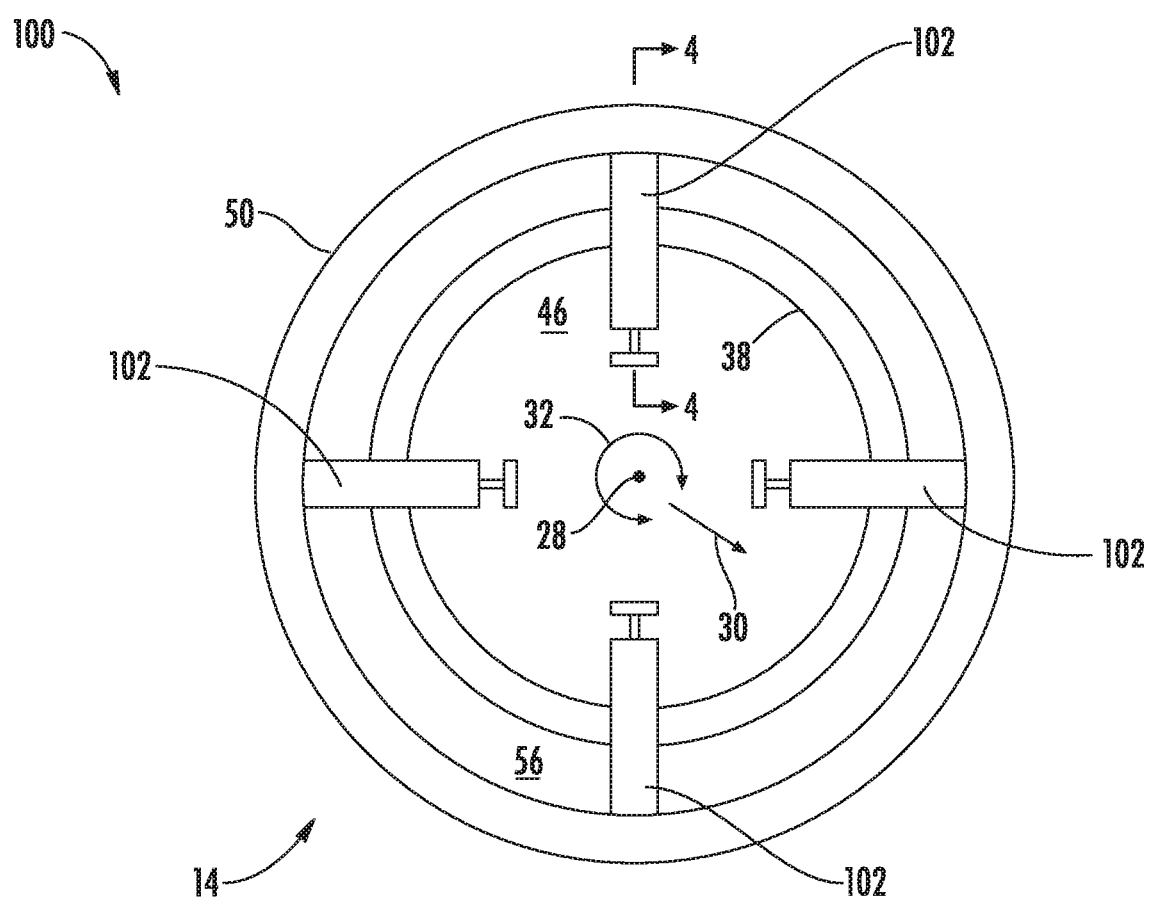
FIG. 3 is a top view of one embodiment of an axial retention assembly for combustor components of a gas turbine engine in accordance with aspects of the present disclosure, particularly illustrating a plurality of axial retention tools coupling a liner of the combustor and a sleeve of the combustor.

Referring now to FIG. 3, a schematic view of one embodiment of an axial retention assembly 100 for combustor components of a gas turbine engine is illustrated in accordance with aspects of the present disclosure. In general, the axial retention assembly 100 will be described herein with reference to the gas turbine engine 10 described above with reference to FIGS. 1 and 2. However, the disclosed system 100 may generally be used with gas turbine engines having any other suitable engine configuration.

In several embodiments, the axial retention assembly 100 may include one or more axial retention tools 102. In general, when the combustor 14 is installed in the compressor discharge casing 34 (FIG. 2) of the gas turbine engine 10, the end cover 68 and the fuel nozzles 66 (FIG. 2) may not be installed or otherwise present within or the combustor 14. In this respect, the axial retention tool(s) 102 may be positioned within the combustion chamber 46, the flow passage 56, and/or the head end volume 64 of the combustor 14. Specifically, as will be described in greater detail below, each axial retention tool 102 may be coupled to the forward end 40 of the liner 38 and the forward end 52 of the sleeve 50 such that tool(s) 102 collectively reduce or prevent relative movement between the liner 38 and the sleeve 50 along the axial centerline 28 during such installation and associated transportation/handling of the combustor 14. For example, in the illustrated embodiment, the axial retention assembly 100 includes four axial retention tools 102, with such tools 102 being spaced apart from each other in the circumferential direction 32 by ninety degrees. However, in alternative embodiments, the axial retention assembly 100 may include any other suitable number of axial retention tools 102. For example, in one alternative embodiment, the axial retention assembly 100 may include two axial retention tools 102, with such tools 102 being spaced apart from each other in the circumferential direction 32 by 180 degrees.

Figure 4:
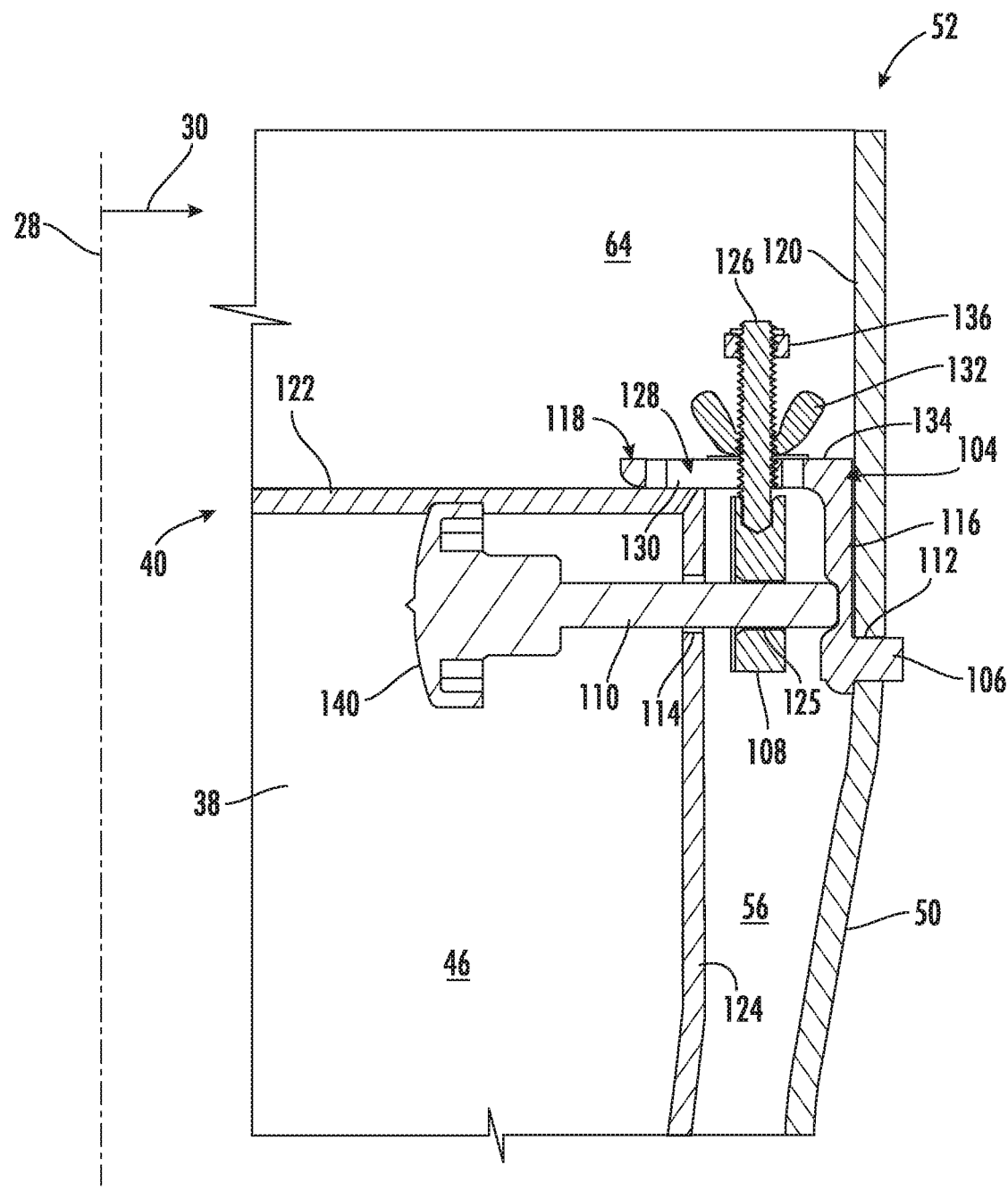
FIG. 4 is a cross-sectional view of one of the axial retention tools shown in FIG. 3 taken generally about line 4-4.
Figure 5:
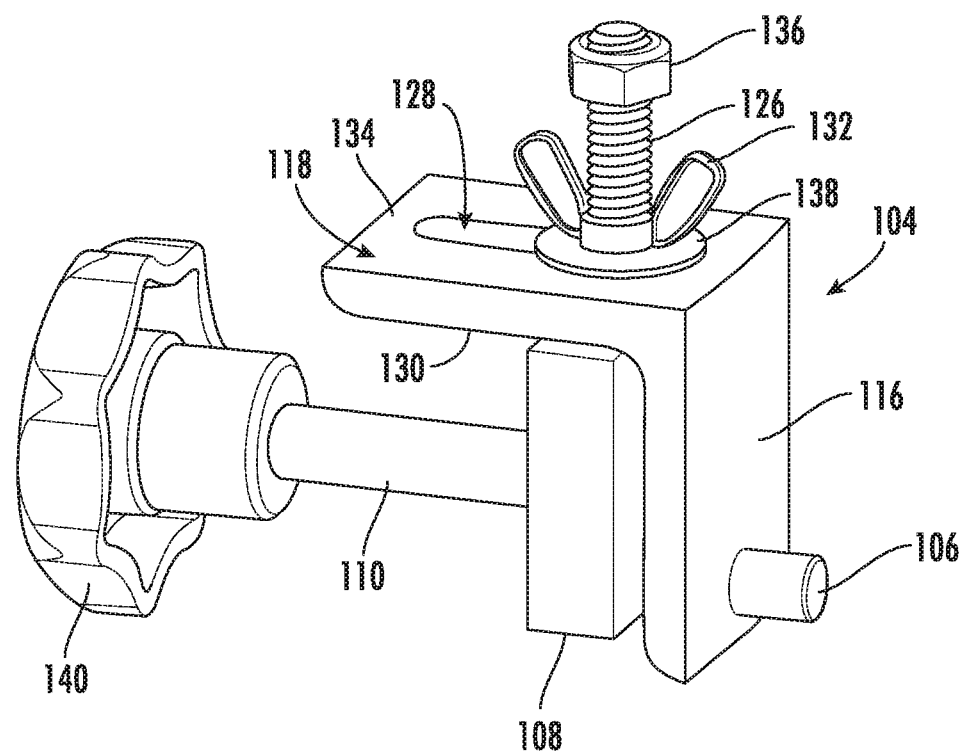
FIG. 5 is a perspective view of the axial retention tool shown in FIG. 4.

FIGS. 4 and 5 illustrate differing views of one embodiment of an axial retention tool 102 in accordance with aspects of the present disclosure. Specifically, FIG. 4 illustrates a cross-sectional view of the axial retention tool 102 installed within the combustor 14 and taken generally about Line 4-4 in FIG. 3. Moreover, FIG. 5 illustrates a perspective view of the axial retention tool 102 removed from the combustor 14.

In several embodiments, the axial retention tool 102 may generally include a frame 104 having a mounting projection 106, a clamp plate 108, and a clamp plate adjustment rod 110. More specifically, when the axial retention tool 102 is installed within the combustor 14, the frame 104 may be positioned at least partially within the flow passage 56 and the head end volume 64 such that the mounting projection 106 is received within a sleeve aperture 112 extending through the sleeve 50. Furthermore, the clamp plate 108 may be adjustably coupled to the frame 104. Additionally, the clamp plate adjustment rod 110 may extend through a liner aperture 114 defined by the liner 38 and threadingly engage the clamp plate 108. In this respect, rotation of the clamp plate adjustment rod 110 relative to the liner 38 may move the clamp plate 108 into contact with the liner 38 and the frame 104 in to contact with the sleeve 50, thereby reducing or preventing relative movement between the liner 38 and the sleeve 50 in the radial direction 30. Moreover, the positioning of the mounting projection 106 within the sleeve aperture 112 and the clamp plate adjustment rod 110 within the liner aperture 114 may reduce or prevent relative movement between the liner 38 and the sleeve 50 along the axial centerline 28.

As shown, when axial retention tool 102 is installed into the combustor 14, the frame 104 may be positioned within the flow passage 56 and the head end volume 64. Specifically, in several embodiments, the frame 104 may include a first wall 116 and a second wall 118. In such embodiments, the first wall 116 may be oriented parallel to the sleeve 50 and positioned partially within the flow passage 56 and partially within the head end volume 64. That is, the first wall 116 may be positioned between the liner 38 and the sleeve 50 in the radial direction 30. As such, the first wall 116 may be in contact with an inner surface 120 of the sleeve 50 adjacent to the upstream end 40 of the liner 38. Moreover, the second wall 118 may extend inward in the radial direction 30 from the first wall 116 (i.e., toward the axial centerline 28) such that the first and second wall 116, 118 are oriented perpendicular to each other. For example, in one embodiment, the first and second wall 116, 118 generally have an L-shape. Additionally, the second wall 118 may be positioned within the head end volume 64 such that a portion of the second wall 118 is in contact with a forward edge 122 of the liner 38. However, in alternative embodiments, the frame 104 may have any other suitable configuration.

As indicated above, the frame 104 may include a mounting projection 106 extending outwardly therefrom. More specifically, the mounting projection 106 may extend outward (i.e., away from the axial centerline 28) in the radial direction 30 from the first wall 116. As when, when the frame 104 is positioned within the flow passage 56 and partially within the head end volume 64 as shown in FIG. 4, the mounting projection 106 may be positioned within or otherwise received in the aperture 112 defined by and extending through the sleeve 50. Such positioning of the mounting projection 106 within the sleeve aperture 112 may, in turn, prevent or reduce relative movement along the axial centerline 28 between the tool 102 and the sleeve 50. Moreover, in the illustrated embodiment, the mounting projection 106 has a cylindrical shape. However, in alternative embodiments, the mounting projection 106 may have any other suitable shape, such as a rectangular prism-like shape.

Furthermore, as indicated above, the axial retention tool 102 may include the clamp plate 108. Specifically, in several embodiments, the clamp plate 108 may be adjustably coupled to the second wall 118 of the frame 102. Additionally, when axial retention tool 102 is installed into the combustor 14, the clamp plate 108 may be positioned between the first wall 116 of the frame 102 and an outer surface 124 of the liner 38 in the radial direction 30. That is, the clamp plate 108 may be positioned within the flow passage 56. Moreover, in one embodiment, the clamp plate 108 be aligned with a portion of the first wall 116 along the axial centerline 28. In this respect, the clamp plate 108 may be movable the in the radial direction 30 between the first wall 116 and the liner 38. As will be described in greater detail below, the clamp plate adjustment rod 110 may threadingly engage the clamp plate 108 via a clamp plate aperture 125 defined by the clamp plate 108 such that rotation of the clamp plate adjustment rod 110 moves the clamp plate 108 between the first wall 116 and the liner 38 in the radial direction 30. In addition, the clamp plate 108 may correspond to a block or plate suitable for exerting a radially inner force on the outer surface 124 of the liner 30. However, in alternative embodiments, the clamp plate 108 may have any other suitable configuration.

In several embodiments, the axial retention tool 102 may include a clamp plate coupling rod 126 and an associated fastener(s) for adjustably coupling the clamp plate 108 to the second wall 118 of the frame 104. More specifically, the second wall 118 may define an elongated slot 128 extending therethrough. Moreover, the clamp plate 108 may be positioned adjacent to a first side 130 of the second wall 118. As shown, the clamp plate coupling rod 126 may be coupled to the clamp plate 108 and extend through the elongated slot 128. In this respect, the elongated slot 128 may permit the clamp plate 108 to move in the radial direction 30 between the first wall 116 of the frame 106 and the liner 38. Additionally, the axial retention tool 102 may include a first fastener 132 that threadingly engages the end of the clamp plate coupling rod 126 adjacent to a second side 134 of the second wall 118 that is opposite the first side 130. For example, the second side 134 of the second wall 118 may be positioned forward of or closer to the end cover 68 (FIG. 2) than the first side 130 of the second wall 118. In general, the first fastener 132 may rotated relative to the clamp plate coupling shaft 126 to adjust the position of the clamp plate 108 relative to the second wall 118 of the frame 104. As will be described below, such adjustments may allow the clamp block aperture 125 to be aligned with the liner aperture 114 in the radial direction 30. Additionally, the axial retention tool 102 may include a second fastener 136 that threadingly engages end of the clamp plate coupling rod 126. In such an embodiment, the first fastener 132 may be positioned between the second fastener 136 and the second wall 118 of the frame 104 in the radial direction 30 to prevent the first fastener 132 from threadingly disengaging the clamp plate coupling rod 126. In one embodiment, a washer 138 may be positioned between the first fastener 132 and the second wall 118 of the frame 104 in the radial direction 30. In the illustrated embodiment, the first fastener 130 corresponds to a wing nut and the second fastener 136 corresponds to a nyloc nut. However, in alternative embodiments, the first and second fasteners 132, 136 may correspond to any other suitable types of fasteners.

As indicated above, the clamp plate adjustment rod 110 may generally move the clamp plate 108 between the first wall 116 of the frame 104 and the liner 38 in the radial direction 30. In this respect, the plate adjustment rod 110 may be used to push the first wall 116 of the frame 104 into contact with the sleeve 50 and the clamp plate 108 into contact with the liner 38. More specifically, in several embodiments, the clamp plate adjustment rod 110 may extend through the liner aperture 114 defined by the forward end 40 of the liner 38. Such positioning of the clamp plate adjustment rod 110 within the liner aperture 114 may, in turn, prevent or reduce relative movement along the axial centerline 28 between the tool 102 and the liner 38. Furthermore, the clamp plate adjustment rod 110 may extend through and threadingly engage the clamp plate 108. In this respect, rotation of the clamp plate adjustment rod 110 relative to the liner 38 may cause the clamp plate adjustment rod 110 to translate or otherwise move in the radial direction 30 relative to the liner 38. The radial movement of the clamp plate adjustment rod 110 may, in turn, move the clamp plate 108 in the radial direction 30 between the liner 38 and the first wall 116 of the frame 104. As such, sufficient rotation of the clamp plate adjustment rod 110 may push the first wall 116 of the frame 104 into contact with the sleeve 50 and the clamp plate 108 into contact with the liner 38. Additionally, in one embodiment, a handle 154 may be coupled to the radially inner end of the threaded rod 136 to permit easy rotation of the clamp plate adjustment rod 136.

In general, the axial retention tool 102 may be installed within the combustor 14 to reduce or prevent relative movement between the liner 38 and the sleeve 50 along the axial centerline 28 and/or in the radial direction 30. More specifically, the axial retention tool 102 (with the clamp plate adjustment rod 110 removed) may be positioned within the flow passage 56 and the head end volume 64 of the combustor 14 such that the mounting projection 108 is positioned within the sleeve aperture 112 and clamp plate 108 is positioned within the flow passage 56. After such positioning, the first wall 116 of the frame 104 may be in contact with the inner surface 120 of the sleeve 50 and a portion of the second wall 118 of the frame 104 may be in contact with an upstream edge 122 of the liner 38. The first fastener 132 may be rotated to adjust the positioning of the clamp plate 108 relative to the second wall 118 of the frame 102 to align the clamp plate aperture 125 with the liner aperture 114 along the axial centerline 28. Thereafter, the clamp plate adjustment rod 110 may be inserted through the liner aperture 114 and rotated relative to the liner 38 to threadingly engage clamp plate 108 via the clamp plate aperture 125. Continued rotation of the clamp plate adjustment rod 110 may cause the first wall 116 of the frame 104 to contact the sleeve 50 and the clamp plate 108 to contact the liner 38. Such contact may, in turn, cause the first wall 116 to exert a radially outward force on the sleeve 50 and the clamp plate 108 to exert a radially inner force on the liner 38. However, in alternative embodiments, the axial retention tool 102 may be installed within the combustor 14 in any other suitable manner.

As indicated above, the axial retention assembly 100 may include a plurality of axial retention tools 102. In such embodiments, each axial retention tool 102 may be installed in the same manner as described above.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An axial retention assembly for combustor components of a gas turbine engine, the axial retention assembly comprising:
    a combustor defining an axial centerline extending between a forward end of the combustor and an aft end of the combustor, the combustor further defining a radial direction extending orthogonally outward from the axial centerline, the combustor including a liner defining an aperture extending therethrough, the combustor further including a sleeve defining a sleeve aperture extending therethrough, the sleeve positioned radially outward from and at least partially circumferentially positioned around the liner;
    a frame including a mounting projection positioned within the sleeve aperture;
    a clamp plate adjustably coupled to the frame;
    a clamp plate adjustment rod extending through the liner aperture and threadingly engaging the clamp plate such that relative movement between the liner and the sleeve along the axial centerline is reduced.

2. The axial retention assembly of claim 1, wherein the clamp plate is positioned between the liner and the sleeve in the radial direction.

3. The axial retention assembly of claim 1, wherein rotation of the clamp plate adjustment rod relative to the liner moves the clamp plate between the liner and the frame in the radial direction.

4. The axial retention assembly of claim 1, wherein the mounting projection extends outward from the frame along in the radial direction.

5. The axial retention assembly of claim 1, wherein the frame comprises a first wall and a second wall, the mounting projection extending outward from the first wall, the clamp plate being adjustably coupled to the second wall.

6. The axial retention assembly of claim 5, wherein the first wall is oriented perpendicular to the second wall.

7. The axial retention assembly of claim 5, wherein the first wall is positioned between the liner and the sleeve in the radial direction.

8. The axial retention assembly of claim 5, wherein the second wall extends inward along the radial direction from the first wall.

9. The axial retention assembly of claim 1, further comprising:
    a clamp plate coupling rod coupled to the clamp plate, wherein the frame defines an elongated slot extending therethrough, the clamp plate coupling rod extending through the elongated slot.

10. The axial retention assembly of claim 9, further comprising:
    a first fastener threadingly engaging the clamp plate coupling rod;
    a second fastener threadingly engaging the clamp plate coupling rod, the first fastener being positioned between the second fastener and the frame along the axial centerline,
    wherein the second fastener prevents the first fastener from threadingly disengaging the clamp plate coupling rod.

11. A gas turbine engine, comprising:
    a combustor defining an axial centerline extending between a forward end of the combustor and an aft end of the combustor, the combustor further defining a radial direction extending orthogonally outward from the axial centerline, the combustor comprising:
        a liner defining an aperture extending therethrough and a combustion chamber therein;
        a sleeve defining a sleeve aperture extending therethrough, the sleeve positioned radially outward from and at least partially circumferentially positioned around the liner, the sleeve and the liner defining a flow passage therebetween; and
    a plurality of axial retention tools, each axial retention tool comprising:
        a frame including a mounting projection positioned within the sleeve aperture;
        a clamp plate adjustably coupled to the frame;
        a clamp plate adjustment rod extending through the liner aperture and threadingly engaging the clamp plate such that relative movement between the liner and the sleeve along the axial centerline is reduced.

12. The gas turbine engine of claim 11, wherein each of the plurality of axial retention tools are circumferentially spaced apart from each other around the combustor.

13. The gas turbine engine of claim 11, wherein the clamp plate is positioned between the liner and the sleeve in the radial direction.

14. The gas turbine engine of claim 11, wherein rotation of the clamp plate adjustment rod relative to the liner moves the clamp plate between the liner and the frame in the radial direction.

15. The gas turbine engine of claim 11, wherein the mounting projection extends outward from the frame along in the radial direction.

16. The gas turbine engine of claim 11, wherein each frame comprises a first wall and a second wall, the mounting projection extending outward from the first wall, the clamp plate being adjustably coupled to the second wall.

17. The gas turbine engine of claim 16, wherein the first wall is oriented perpendicular to the second wall.

18. The gas turbine engine of claim 16, wherein the first wall is positioned between the liner and the sleeve in the radial direction.

19. The gas turbine engine of claim 11, wherein each axial retention tool further comprises:

a clamp plate coupling rod coupled to the clamp plate, wherein the frame defines an elongated slot extending therethrough, the clamp plate coupling rod extending through the elongated slot.

20. The gas turbine engine of claim 19, wherein each axial retention tool further comprises:
a first fastener threadingly engaging the clamp plate coupling rod;
a second fastener threadingly engaging the clamp plate coupling rod, the first fastener being positioned between the second fastener and the frame along the axial centerline,
wherein the second fastener prevents the first fastener from threadingly disengaging the clamp plate coupling rod.

* * * * *